US012694732B2

(12) United States Patent
Nemeth et al.

(10) Patent No.: US 12,694,732 B2
(45) Date of Patent: Jul. 28, 2026

(54) METHOD AND SYSTEM FOR DATA RECORDING IN A VEHICLE COMBINATION

(71) Applicant: KNORR-BREMSE Systeme fuer Nutzfahrzeuge GmbH, Munich (DE)

(72) Inventors: Huba Nemeth, Munich (DE); Zsolt Dudas, Szeged (HU); Adam Szoellosi, Budapest (HU); Andras Batai, Pecs (HU); Valter Zoeldhegyi, Diosd (HU); Tamas Szokol, Budapest (HU); Tamas Komlos, Csavoly (HU); Valer Merza, Szentendre (HU); Zoltan Gyurko, Budapest (HU)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 139 days.

(21) Appl. No.: 18/620,074

(22) Filed: Mar. 28, 2024

(65) Prior Publication Data

US 2024/0331468 A1 Oct. 3, 2024

(30) Foreign Application Priority Data

Mar. 30, 2023 (EP) .................................... 23165279

(51) Int. Cl.
*B62D 53/00* (2006.01)
*G07C 5/00* (2006.01)
*G07C 5/08* (2006.01)

(52) U.S. Cl.
CPC ............. *G07C 5/085* (2013.01); *G07C 5/008* (2013.01)

(58) Field of Classification Search
CPC ...... G07C 5/085; G07C 5/008; G07C 5/0841; B62D 53/00
See application file for complete search history.

(56) References Cited

U.S. PATENT DOCUMENTS 6,795,759 B2 * 9/2004 Doyle .................... G07C 5/085 340/459
8,229,630 B2 * 7/2012 Klug ...................... G07C 5/085 340/436
10,909,782 B1 * 2/2021 Natanzon ............. G07C 5/0841
2002/0143447 A1 * 10/2002 Miller ................ G05B 23/0218 701/33.4
2008/0208533 A1 8/2008 Yokogawa
2014/0087335 A1 * 3/2014 Phelan ................ G08G 1/0112 434/66
2016/0200153 A1 7/2016 Rothstein (Continued)

OTHER PUBLICATIONS

Yang et al., A Novel Design of Information Collection System for Vehicles for Real-time Monitoring, 2019, IEEE, p. 246-249 (Year: 2019).*

(Continued)

*Primary Examiner* — Mcdieunel Marc
(74) *Attorney, Agent, or Firm* — Crowell & Moring LLP

(57) ABSTRACT

A method records data a vehicle combination, where the vehicle combination includes a first vehicle and a second vehicle. The first vehicle includes a first data recorder and the second vehicle includes a second data recorder. The method includes collecting, by the first data recorder, first vehicle operational data of the first vehicle; and collecting, by the first data recorder, second vehicle operational data of the second vehicle.

13 Claims, 4 Drawing Sheets

(56) References Cited

U.S. PATENT DOCUMENTS

| | | | | |
|---|---|---|---|---|
| 2019/0302766 | A1* | 10/2019 | Mondello | G06F 21/64 |
| 2019/0311554 | A1* | 10/2019 | Ewert | G07C 5/008 |
| 2021/0019959 | A1 | 1/2021 | Trinh et al. | |
| 2021/0024224 | A1* | 1/2021 | Mohan | G07C 5/0808 |
| 2021/0090356 | A1* | 3/2021 | Golov | H03M 7/70 |
| 2022/0132284 | A1* | 4/2022 | Tu | H04W 4/40 |

OTHER PUBLICATIONS

He et al., Research on Vehicle Traveling Data Recorder, 2009, IEEE, p. 736-738 (Year: 2009).*

Zhao et al., Design of Vehicle Traveling Data Recorder Based on ARM, 2012, IEEE, p. 1232-1234 (Year: 2012).*

Lohse et al., Telemetry Data Reduction for Space Vehicles, 1964, IEEE, p. 187-192 (Year: 1964).*

Extended European Search Report issued in European Application No. 231652793 dated Sep. 22, 2023 (8 pages).

* cited by examiner

METHOD AND SYSTEM FOR DATA RECORDING IN A VEHICLE COMBINATION

BACKGROUND AND SUMMARY

The present invention relates to a method for data recording during automated driving of a vehicle combination, a system for data recording, and, in particular, to a data recorder unit of a vehicle as a redundancy option for another vehicle's data recorder unit in a vehicle combination.

Data recorders, such as event data recorders (EVD), or data storage systems for automated driving (DSSAD) are essential parts of highly or fully automated vehicles. For example, these recorders are used for road traffic incidents such as collisions, or traffic rule violations and shall resolve legal issues based on the recorded data. They can thus contribute to increase the road traffic safety.

However, for highly or fully automated vehicles, a failure of a data recorder unit might cause the vehicle to be no longer operable. This, in turn, may decrease the availability of the vehicle significantly. Therefore, there is a demand to increase the availability of the vehicle data recorders to maintain the operation of automated vehicles-even if a data recorder does not operate properly.

At least some of the above-mentioned problems are overcome by a method for operating a vehicle data recorder and by a system of data recording according to the independent claims. The dependent claims refer to specifically advantageous realizations of the subject matter claimed by the independent claims.

The present invention relates to a method for data recording of a vehicle combination. The vehicle combination includes a first vehicle (e.g. truck or trailer) and a second vehicle (e.g. truck or trailer), wherein the first vehicle includes a first data recorder and the second vehicle includes a second data recorder.

The method includes the steps of:

collecting, by the first data recorder, first vehicle operational data of the first vehicle; and collecting, by the first data recorder, second vehicle operational data of the second vehicle.

According to embodiments, the method records the data in particular during automated driving (e.g. highly or fully). It is understood that the method shall not be limited to automated driving because the method can also collect the data when a driver drives the vehicle.

Optionally, the method includes further:

collecting, by the second data recorder, the second vehicle operational data of the second vehicle; and/or collecting, by the second data recorder, the first vehicle operational data of the first vehicle.

Therefore, both data recorders may collect the available data, also from other vehicles. As a result, two sets of data may be collected separately and kept up to date. In particular, the data collection may be implemented as a continuous (monitoring) process. According to embodiments, the data collection can last as long as the vehicle combination is in an automated operation mode. Therefore, the combination of the two data recorders enables and maintains a redundant database of collected data for the first vehicle and for the second vehicle. This has the advantage that-if one of the data recorders fails or exhibits an error-all needed data is still available in the respective other data recorder.

There is, however, no need to collect by the first data recorder the first vehicle operational data as well as the second vehicle operational data always in parallel. The collection of vehicle operational data of the respective other vehicle may only be performed when there is a need for this. Therefore, optionally, the method may further include:

detecting a failure in one of the first and second data recorders;

only when the failure has been detected in the second data recorder, the step of collecting the second vehicle operation data in the first data recorder may be performed; and/or only when the failure has been detected in the first data recorder, the step of collecting the first vehicle operation data in the second data recorder may be performed.

In other words, if no failure is detected the steps of collecting the second/first vehicle operation data in the first/second data recorder needs not to be performed. Only upon a failure detection the remote data collection may be started (i.e. may be triggered by a failure event).

The vehicle operation data can be any data that can be used to resolve legal issues in case a traffic accident happens. This may include data such as speed values, steering angles and brake actuation as function of time, when and how a given maneuver has been performed, which objects were detected in the surrounding, etc.

The first vehicle may further include a first domain controller for controlling a collection and forwarding of sensor data. The second vehicle may further include a second domain controller for controlling a collection and forwarding of further sensor data. Then, optionally, the method includes further: exchanging the first vehicle operational data and/or the second vehicle operational data between the first domain controller and the second domain controller, wherein a wireless or wired connection may be utilized.

A vehicle domain controller should be understood as a device controlling one or more functions of the vehicle in a particular area (e.g. chassis or trailer). They are present in many vehicles and may have an integrated gate function for forwarding data. Therefore, there is synergistic effect making use of the functionality already implemented by the domain controller.

Optionally, the step of detecting the failure may include ascertaining an absence of a keepalive signal or receiving of a failure signal. It should be understood that all kind of errors or malfunctioning (whether minor or severe) can be protocolled in log files and the detection of the failure can also be triggered by a respective entry in these log files. It is further understood that the detected failure may be only minor, i.e. the faulty data recorder may still be operational—at least to some extent. But it may be of advantage to start collecting data already when there is an increased risk of a complete failure at a later stage.

The first vehicle operational data may be collected by a plurality of first data sources. The second vehicle operational data may be collected by a plurality of second data sources. Then, optionally, the steps of collecting vehicle operational data by the first data recorder and/or by the second data recorder may include storing the collected vehicle operational data in a local storage device or at a remote storage device (e.g. cloud-based storage) utilizing a wired data link or a wireless data communication.

Embodiments relate also to a system for data recording of a first vehicle (a truck or trailer). Also here, the system may record data during automated driving. The system includes a first data recorder configured to collect first vehicle operational data of the first vehicle. The first vehicle forms with a second vehicle a vehicle combination. The system comprises a control unit configured:

to control collecting first vehicle operational data of the first vehicle in the first data recorder; and to control collecting second vehicle operational data of a second vehicle in the first data recorder.

Optionally, the control unit is further configured to detect a failure of a second data recorder in the second vehicle;

to control collecting second vehicle operational data only upon detecting the failure, wherein a correctly operating second data recorder is configured to collect second vehicle operational data (e.g. during automated driving) of the second vehicle.

The first vehicle may further comprise a first domain controller. The second vehicle may further comprise a second domain controller. The first and second domain controllers may be adapted to provide at least one function independent from collecting vehicle operational data. Then, optionally, the first data recorder and/or the first control unit is/are integrated in the first domain controller. Similarly, the data recorder and/or the second control unit may be integrated in the second domain controller.

Optionally, the first vehicle is a towing vehicle or a towed vehicle. Likewise, the second vehicle may be another towing vehicle or another towed vehicle.

Embodiments relate also to a vehicle combination with at least two coupled vehicles and includes a system for data recording as described before, wherein the system is implemented in one or both vehicles of the vehicle combination.

Optionally, the vehicle combination includes a communication interface for exchanging vehicle operational data collected by respective data recorders between both vehicles. The data exchange may be triggered by starting an automated operation of the vehicle combination or by detecting a failure in one of the data recorders. This again provides the advantage of a redundant data recording, both recorders may collect both data-all the time or only when a failure as occurred.

The method may also be implemented in software or a computer program product. Therefore, embodiments can be implemented in any electronic control unit (ECU) of the vehicle or can be implemented by software or as a software module in an ECU. Therefore, an embodiment relates also to a computer program product or a data storage device having program code for performing the method, when the computer program is executed on a processor. For example, a computer-readable storage device with stored program code may cause the system of data recording as described before to carry out the method as described.

It is further understood that the order of steps may be different—as long as the desired effect is achieved.

Embodiments overcome the above-mentioned problems by providing a redundancy for an available vehicle data recorder on a vehicle by a data recorder of another vehicle. For example, a vehicle data recorder of one vehicle can provide a redundancy option in case a data recorder of another vehicle in a vehicle combination exhibits a failure. The vehicle combination can refer to a combination of a truck and a trailer, wherein each of them, the truck and the trailer, may include a separate vehicle data recorder.

Some examples of the systems and/or methods will be described in the following by way of examples only, and with respect to the accompanying figures.

DETAILED DESCRIPTION OF THE DRAWINGS

Figure 1:
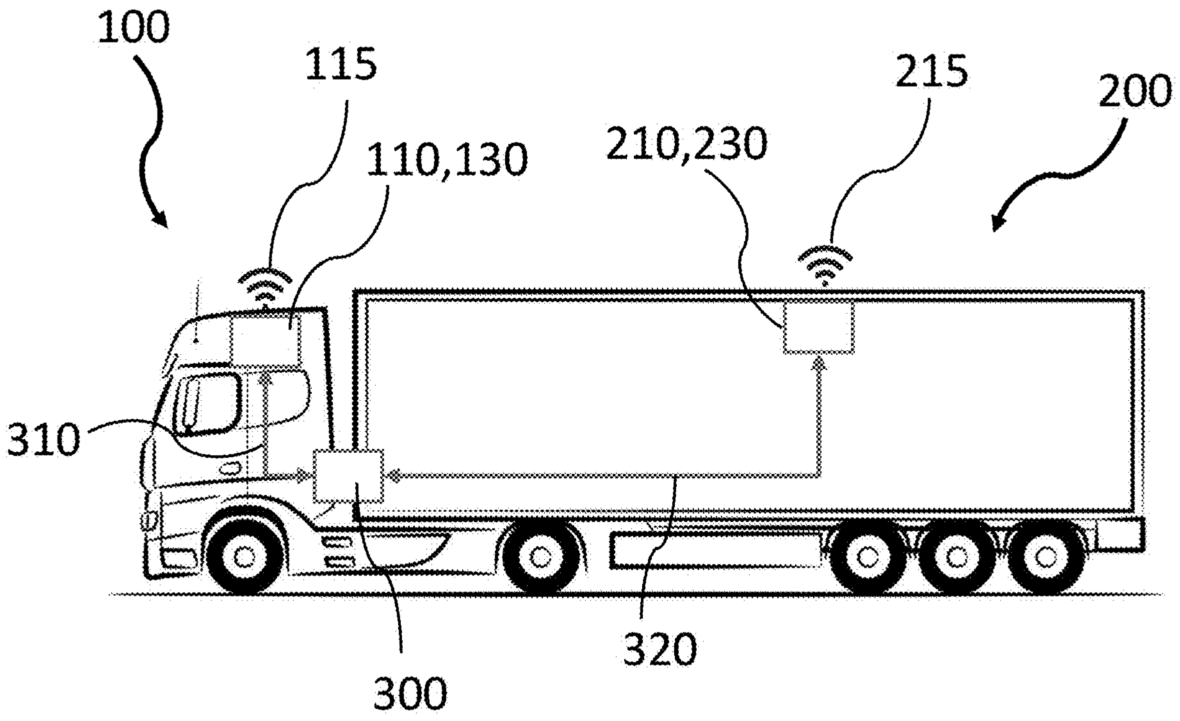
FIG. 1 depicts a vehicle data recorder system according to an embodiment of the present invention.

FIG. 1 depicts a system of data recording during automated driving of a first vehicle 100 and a second vehicle 200 according to an embodiment of the present invention. The first vehicle 100 may be a truck or a trailer, wherein in the following it will mostly be assumed that the first vehicle 100 is the truck. The second vehicle 200 may be another truck or another trailer, wherein in the following it will mostly be assumed the second vehicle 200 is the trailer. In other embodiments it is vice versa. The system includes a first data recorder 110 configured to collect first vehicle operational data 115 of the first vehicle 100 and a control unit 130, which in the depicted embodiment in integrated in the first data recorder 110 (e.g. share a same housing). The control unit 130 is configured:

to control collecting first vehicle operational data 115 of the first vehicle 100 in the first data recorder 110; and to control collecting second vehicle operational data 215 of a second vehicle 200 in the first data recorder 110.

The control unit 130 may further be configured:

to detect a failure of a second data recorder 210 in a second vehicle 200; and to collect the second vehicle operational data 215 of the second vehicle 200 upon the detection of the failure.

A correctly operating second data recorder 210 is configured to collect the second vehicle operational data 215 (e.g. during automated driving) of the second vehicle 200. The first vehicle 100 and the second vehicle 200 form a vehicle combination.

Here and in the following, the vehicle combination may include at least two separable parts such as a truck with a trailer or more than two trailers. Therefore, the term "vehicle" does not necessarily refer to motor vehicle, but may also include towed vehicles. All vehicles of the vehicle combination 100, 200 may have a data recorder 110, 210 and these data recorders 110, 210 are utilized, according to embodiments, to provide a redundancy option for each other data recorder. For example, a vehicle data recorder of a truck can provide a backup for vehicle data recorder for the trailer and vice-versa.

According to this embodiment, the first vehicle 100 includes the first data recorder 110 with its control unit 130. Likewise, the second vehicle 200 includes the second data recorder 210 with its control unit 230. When no failure is present, the first data recorder 110 collects (at least) the first vehicle operational data 115 and the second vehicle data recorder 210 collects (at least) the second vehicle operational data 215. The first vehicle operational data 115 can be collected via a wireless or wired data communication. Similarly, the second vehicle operational data 215 can be collected via a wireless or wired data communication.

In addition, the first vehicle data recorder 110 and the second vehicle data recorder 210 may exchange data and information using data lines 310, 320 connecting the vehicle data recorder 110, 210 with a communication interface 300. The communication interface 300 is configured to establish, for example, a wired communication, between the first vehicle 100 and the second vehicle 200, when the vehicle combination is built. According to further embodiments, the communicated information via the communication interface 300 can be customized. It may include video streams or images which are collected by one of the data recorders 110, 210, for example as part of a continuous surveillance operation to be performed for a fully automated vehicle driving.

Moreover, the communication setup between the first and second data recorder 110, 210 may include also information or signals indicating a status of the both recorders 110, 210. Therefore, the state of each data recorder 110, 210 may be shared with the other data recorder 210, 110. This status or state information may be indicative of a fully operational data recorder or may indicate an error or failure of one of the data recorders 110, 210 in which case the other, i.e. the flawlessly operating data recorder, may take over the functions of the faulty or insufficient operating data recorder.

According to embodiments, the data recorders 110, 210 may be set up on either vehicle 100, 200 as stand-alone devices, which may have integrated the control units 130, 230. The control units 130, 230 can be any data processing device that is able to perform the data processing for collecting and exchanging of the data. In case of a correct operation, i.e. no failure has been detected, the first and second data recorders 110, 210 store and/or provide the collected vehicle operational data 115, 215, for which a wireless communication protocol (for example WLAN or Wi-Fi) may be utilized. In addition or alternatively to the possibly wireless exchange of vehicle operational data 115, 215, both data recorders 110, 210 may be connected partly or completely via a wired link (e.g. galvanic, optical, etc.) to exchange data and information.

Figure 2:
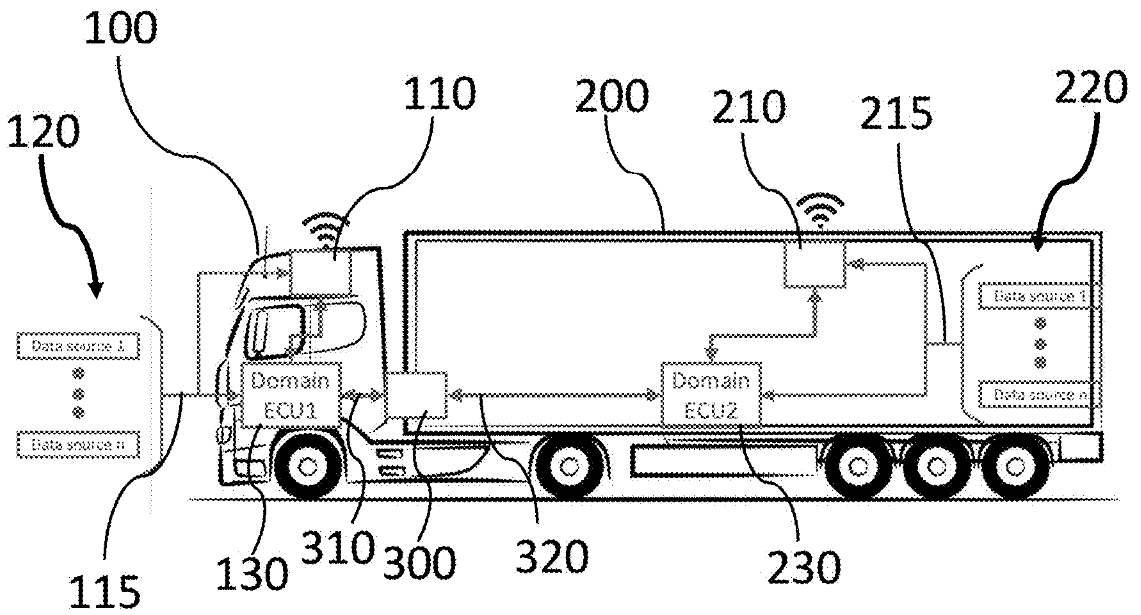
FIG. 2 depicts a system for data recording according to another embodiment.

FIG. 2 depicts a system for data recording according to another embodiment, where the first vehicle 100 comprises a first control unit 130 as a unit separate from the first data recorder 110, which is operable to control at least part of the function of the first data recorder 110. Similarly, the second vehicle 200 may include a separate second control unit 230 being configured to control at least some functions of the second data recorder 210. In addition, according to this embodiment, a first domain controller 130 is utilized as first control unit 130, and a second domain controller 230 may be utilized as the second control unit 230.

The domain controller(s) 130, 230 are centralized electronic control units that control at least one vehicle function in a particular domain (area) of the vehicle(s) 100, 200. The domain controller(s) 130, 230 may already be configured to provide collecting and routing of data. Therefore, by implementing the first and second control unit 130, 230 in domain controllers, the first and second control unit 130, 230 are adapted to provide various control options, which are independent from the data recording, for the first or second vehicle 100, 200 in a respective domain of the vehicle(s) 100, 200.

It is of course understood that the first and second data recorder 110, 210 may still have integrated data processing or control devices.

According to this embodiment, the first data recorder 110 collects the first vehicle operational data 115 from a plurality of first data sources 120. The first data sources 120 may also provide the first vehicle operational data 115 to the first domain controller 130. Similarly, the second data recorder 210 may be configured to collect the second vehicle operational data 215 from a second plurality of data sources 220. The collected data 215 from the second data sources 220 may also be forwarded to the second domain controller 230. Again, as in the previous embodiment, a communication interface 300 may be provided that enables a data and information exchange between the first domain controller 130 using the first data link 310 and to the second domain controller 230 using a second data link 320.

All other functions can be implemented as in the embodiments described before.

Figure 3:
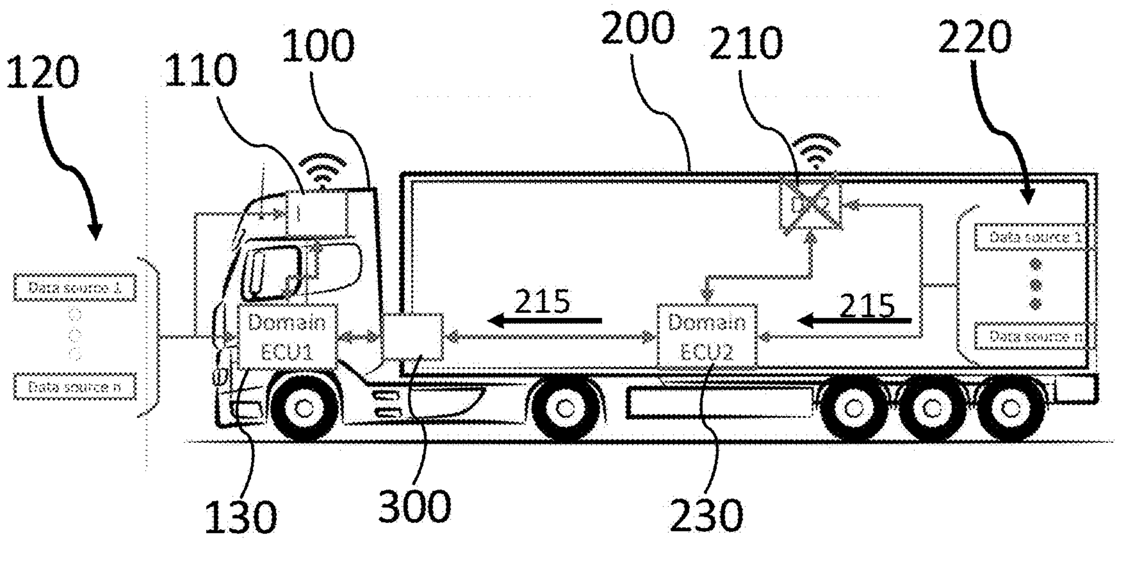
FIG. 3 depicts a system for data recording according to yet another embodiment.

FIG. 3 illustrates the situation that, for example, the second data recorder 210 exhibits a failure so that the second data recorder 210 is no longer able to reliably collect the second operational vehicle data 215 from the second plurality of data sources 220. This situation can be detected by the second domain controller 230. This detection may be achieved by detecting an absent of a keepalive signal which otherwise is continuously transmitted from the second data recorder 210. Moreover, the second data recorder 210 may also issue an error signal to the second domain controller 230 indicating an error in the second data recorder 210.

In response to this detection of a failure of the second data recorder 210, the second domain controller 230 is configured to forward the second vehicle operational data 215 from the second plurality of data sources 220 via the communication interface 300 to the first domain controller 130 which, in turn, triggers the collection of the second vehicle operational data 215 by the first data recorder 110.

Therefore, it is a similar operation as implemented in the embodiment of FIG. 1, with the only difference that in the embodiments of FIG. 2 and FIG. 3, the control units 130, 230 are separate units for which already present units in the vehicle such as the domain controller may be utilized. It is understood that the domain controllers provide also other functions, different from the data collection by the data recorder 110, 120. In contrast hereto, in FIG. 1 the first data recorder 110 and the second data recorder 210 include a processing unit that enables the forwarding of the collected second vehicle operational data 215 in case a failure occurred at the second data recorder 210.

All other functions can be implemented as in the embodiments described before. For example, as in the previous embodiments, the collection of the vehicle operation data 115, 215 can be performed utilizing a wireless or a wired data link.

Figure 4:
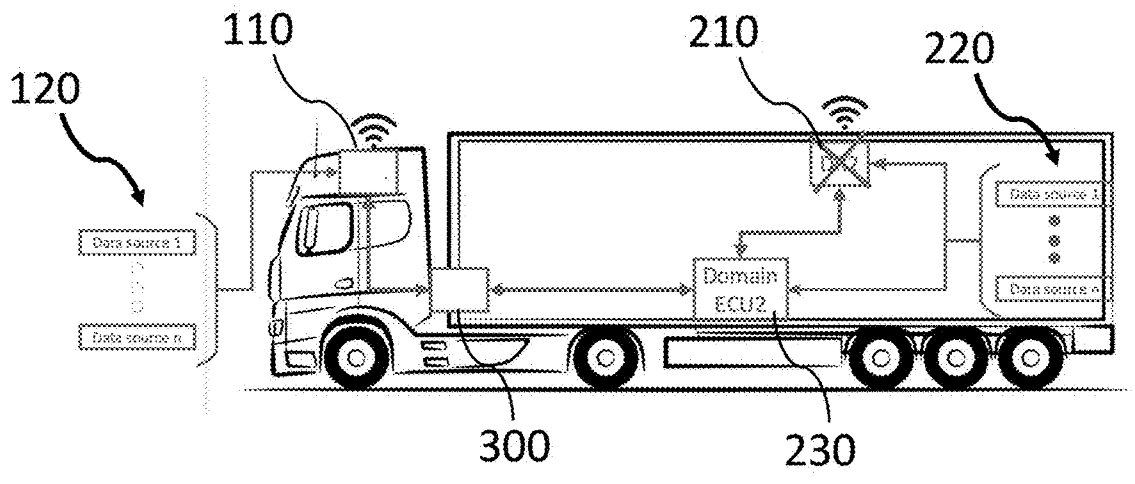
FIG. 4 depicts a system for data recording according to yet another embodiment.

FIG. 4 depicts a system of data recording according to yet another embodiment, where only the second vehicle 200 uses a domain controller 230 for controlling the data collection of the second vehicle operation data 215 by the first data recorder 110. Again, the second domain controller 230 is a separate unit from the second data recorder 210. On the other hand, the first vehicle 100 does not utilizes a separated domain controller for controlling the data collection of the first vehicle operation data 115. Therefore, the first vehicle operational data 115 are directly collected from the first plurality of data sources by the first data recorder 110.

Like in the embodiment of FIG. 3, in case a failure in the second data recorder 210 is detected, the second vehicle operational data 215 are forwarded from the second plurality of data sources 220, via the second domain controller 230 to the communication interface 300 and subsequently to the first data recorder 110 to be stored in the first vehicle 100.

All other functions can be implemented as in the embodiments described before. Therefore, as in the other embodiment, no vehicle operational data are lost, even though a failure has occurred in one of the data recorders 110, 210.

Figure 5:
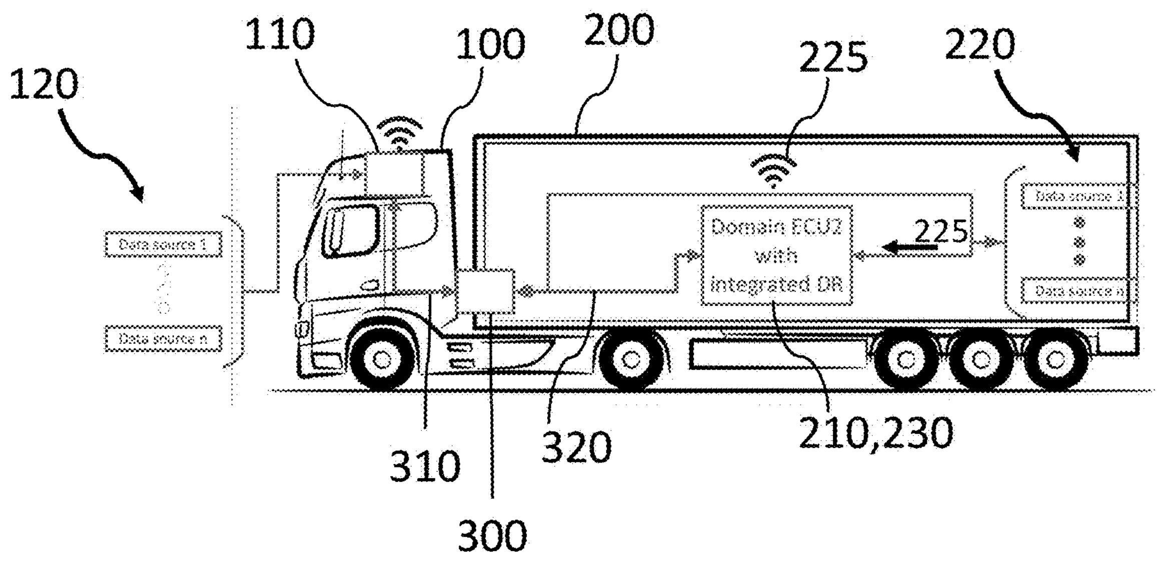
FIG. 5 depicts a system for data recording according to yet another embodiment.

FIG. 5 depicts a system of data recording according to yet another embodiment, where the second domain controller 230 includes the second data recorder 210 as an integrated component (e.g. in a common housing). Otherwise, it has the same functionality as the embodiment of FIG. 4. Again, the first and/or the first vehicle operational data 115, 215 can be received by the first recorder 110 and/or by the second domain controller 230 with the integrated second recorder 210 again using a wireless and/or wired communication. Likewise, the data exchange between the first and second vehicle 110, 200 can be performed using the wireless and/or the wired communication link. The first and/or the first vehicle operational data 115, 215 can be provided again by the plurality of first and second data sources 120, 220.

If a failure is detected, e.g. for the integrated second data recorder 210, the system may transmit the second vehicle operational data 225 to the first data recorder 110 again via the communication interface 300. For this, the wired connection links 320, 310 can be utilized. Alternatively or additionally, the wireless communication interfaces can be used to exchange the vehicle operational data 115, 215.

Here and also in the previous embodiments, the failure can also involve the control unit or domain controller so that the data forwarding may be blocked. In this case, the first or second vehicle operational data 115, 215 can be transmitted to the respective other data recorder 115, 215 utilizing the wireless communication. For example, data from the plurality of second/first data source 220, 210 can be transmitted wirelessly directly to the correctly operating data recorder.

All other functions can be implemented as in the embodiments described before.

Figure 6:
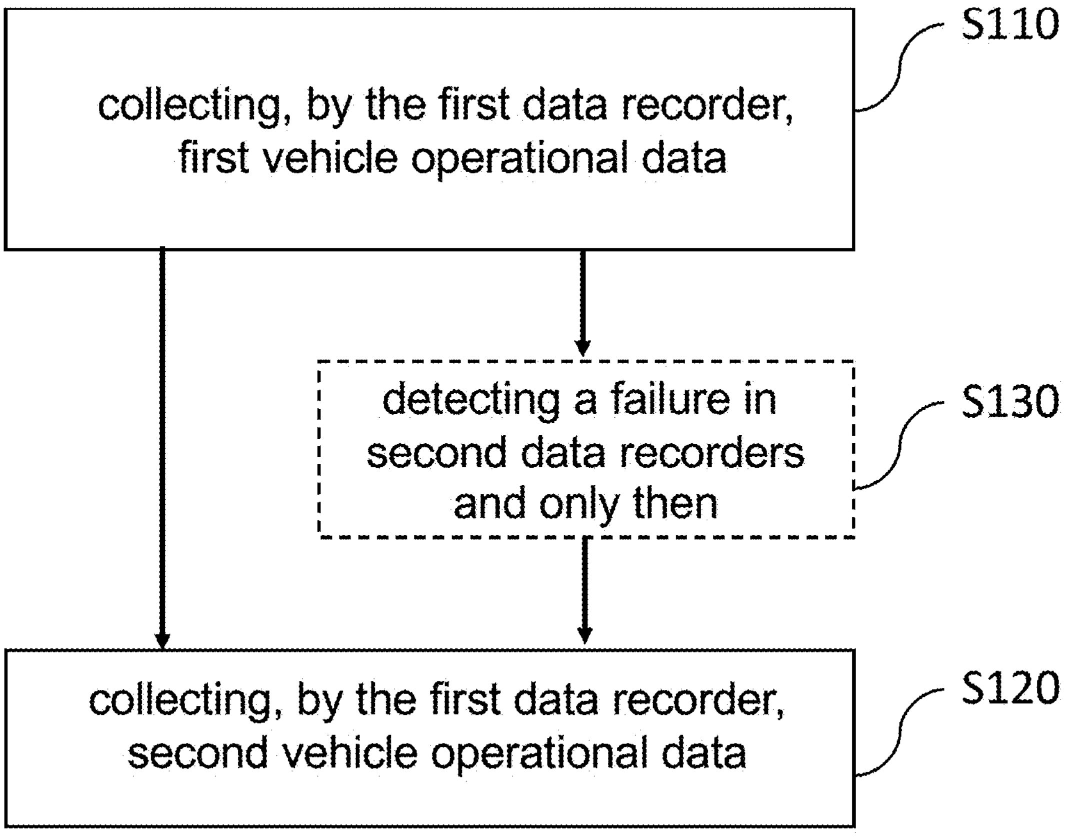
FIG. 6 depicts schematically a flow chart for a method for data recording during automated driving of a vehicle combination according to an embodiment.

FIG. 6 depicts a flow diagram of a method for data recording (e.g. during automated driving) of a vehicle combination. The vehicle combination includes a first vehicle 100 and a second vehicle 200, the first vehicle 100 includes a first data recorder 110 and the second vehicle 200 includes the second data recorder 210. The method includes the steps of:

collecting S110, by the first data recorder 110, first vehicle operational data 115 of the first vehicle 100; and collecting S120, by the first data recorder 110, second vehicle operational data 215 of the second vehicle 200.

This method may also be a computer-implemented method. A person of skill in the art would readily recognize that steps of various above-described methods may be performed by programmed computers. Embodiments are also intended to cover program storage devices, e.g., digital data storage media, which are machine or computer readable and encode machine-executable or computer-executable programs of instructions, wherein the instructions perform some or all of the acts of the above-described methods, when executed on the computer or processor.

All embodiments may thus provide a redundant data recording for a vehicle combination without the need to install new hardware—at least as long as each vehicle has its own data recorder available.

Various (common) aspects of embodiments can be summarized as follows.

The data recorders 110, 210 can be implemented as stand-alone devices (see FIG. 1 to FIG. 3) or can be integrated into a control unit 230 (e.g. a domain controller) as illustrated in FIG. 5. For this, any other electronic control unit, ECU, of the vehicles can be utilized. As described with FIG. 1 and FIG. 2, for example, the communication between the data recorder units 110, 210 in the vehicle combination can be through a direct or indirect communication link, for example over a domain or a gateway electronic control unit 130, 230 of the respective vehicles 100, 200.

In all described embodiments, the vehicle combination 100, 200 was equipped with multiple data recorders 110, 210 that provide a redundancy to each other and thus increase the availability of the vehicle combination 100, 200, because a failure in one of the included data recorders 110, 210 does not cause a blocking of the whole vehicle combination 100, 200. This is an important advantage for highly or fully automated driving. In particular, in case of a failure of any of the data recorders 110, 210, the needed data such as the vehicle operation data 115, 215 can first be collected by the domain controller 130, 230 of a given vehicle 100, 200 that can send this data to the other vehicle's data recorder unit 110, 210 which, in turn, can upload the recorded data, for example, to a cloud server.

According to the described embodiments, if no failure has been detected, a normal operation is performed, where all data recorder units 110, 210 store and/or provide the collected data 115, 215 to themselves, e.g., via their wireless/wired communication protocol. If a failure is detected in any of the data recorders 110, 210, the data is sent to the other vehicle's data recorder 210, 110 so that it can be stored or uploaded from there to the exemplary cloud server. The exemplary domain electronic control unit (or domain controller 130, 230) of the vehicle can send the data through a connection that is established among the vehicle components 100, 200. From here, the data can be directly sent to the other vehicle's data recorder unit 110, 210 or it can be sent to the domain electronic control unit 130, 230 of the other vehicle or to both simultaneously.

According to an embodiment, the failure of one of the data recorders 110, 210 can be detected by different means. For example, the data recorder may send a status message that states a failure, or the domain electronic control unit 130, 230 monitors the data recorder 110, 210 and detects the failure itself.

According to another embodiment, a further redundancy level could be achieved by a redundant domain controller 130, 230 of the vehicles, i.e. a double failure: a failure of the data recorders 110, 210 and of the primary domain controller 103, 230 (electronic control unit). In case of a common failure of the data recorder 110, 210 in one of the vehicles 100, 200 and the failure of the domain electronic control unit 130, 230 on the other vehicle 200, 100, the data may be collected by the first vehicle's (remaining) domain control unit 110 and directly sent to the data recorder unit 110, 120 of the second vehicle 200, or vice-versa.

Further embodiments relate to a combination of vehicles 100, 200 with at least two vehicles that are equipped with data recording devices 110, 210, which can communicate with each other.

In the combination of vehicles 100, 200, the communication between the data recording devices may be realized over a direct connection.

In the combination of vehicles 100, 200, a direct communication between the data recording devices 110, 210 can be realized over a wired connection (e.g. galvanic, optical, etc.).

In the combination of vehicles 100, 200, a direct communication between the data recording devices 110, 210 may be realized over a wireless connection.

In the combination of vehicles 100, 200, a direct communication between the data recording a communication between the data recording devices 110, 210 may be realized over indirect (i.e. over another electronic unit) connection.

In the combination of vehicles 100, 200, an indirect communication between the data recording devices 110, 210 may be realized over a wired connection (e.g. galvanic, optical, etc.).

In the combination of vehicles 100, 200, an indirect communication between the data recording devices 110, 210 may be realized over a wireless connection.

In the combination of vehicles 100, 200, the data recording devices 110, 210 may store the same data on different recording devices 120, 110 for redundancy purpose.

Optionally, in redundant operation mode only a part of the signals are transmitted and/or recorded to reduce the required bandwidth or the memory size.

Embodiments provide the advantage that the number or complexity of components can be reduced, because a redundant data recorder 110, 210 does not need to be implemented for each vehicle component. Especially trailers, which have only a single data recorder (an in-vehicle redundancy of data recorder is not required) can be used within vehicle combinations to enable the desired redundancy.

The description and drawings merely illustrate the principles of the disclosure. It will thus be appreciated that those skilled in the art will be able to devise various arrangements that, although not explicitly described or shown herein, embody the principles of the disclosure and are included within its scope.

Furthermore, while each embodiment may stand on its own as a separate example, it is to be noted that in other embodiments the defined features can be combined differently, i.e. a particular feature descripted in one embodiment may also be realized in other embodiments. Such combinations are covered by the disclosure herein unless it is stated that a specific combination is not intended.

LIST OF REFERENCE SIGNS

100 first vehicle
110 first data recorder
115 first vehicle operational data
120 first data source(s)
130 first domain controller
200 second vehicle
210 second data recorder
215 second vehicle operational data
220 second data source(s)
230 second domain controller
300 communication interface
310, 320 wired communication links

What is claimed is:

1. A method for data recording of a vehicle combination, where the vehicle combination includes a first vehicle and a second vehicle, the first vehicle including a first data recorder and the second vehicle including a second data recorder, the method comprising:

collecting, by the first data recorder, first vehicle operational data of the first vehicle that is a towing vehicle of the vehicle combination; and collecting, by the first data recorder, second vehicle operational data of the second vehicle that is a towed vehicle of the vehicle combination coupled to the towing vehicle.

2. The method according to claim 1, further comprising:

collecting, by the second data recorder, the second vehicle operational data of the second vehicle; and collecting, by the second data recorder, the first vehicle operational data of the first vehicle.

3. The method according to claim 2, further comprising:

detecting a failure in one of the first and second data recorders; and only when the failure has been detected in the second data recorder, collecting the second vehicle operation data in the first data recorder;

only when the failure has been detected in the first data recorder, collecting the first vehicle operation data in the second data recorder.

4. The method according to claim 3, wherein the step of detecting the failure comprises ascertaining an absence of a keepalive signal or receiving of a failure signal.

5. The method according to claim 2, wherein the first vehicle operational data are collected by a plurality of first data sources and/or the second vehicle operational data are collected by a plurality of second data sources, and wherein the steps of collecting vehicle operational data by the first data recorder and/or by the second data recorder comprise storing the collected vehicle operational data in a local storage device or at a remote storage device utilizing a wired data link or a wireless data communication.

6. The method according to claim 1, wherein the first vehicle includes a first domain controller for controlling a collection and forwarding of data, and/or wherein the second vehicle includes a second domain controller for controlling a collection and forwarding of further data, the method further comprising:

exchanging the first vehicle operational data and/or the second vehicle operational data between the first domain controller and the second domain controller utilizing a wireless or wired connection.

7. The method according to claim 1, wherein the collecting is carried out during driving of the vehicle combination.

8. A system for data recording of a first vehicle, comprising:

a first data recorder configured to collect first vehicle operational data of the first vehicle, wherein the first vehicle is a towing vehicle that forms a vehicle combination with a second vehicle that is a towed vehicle coupled to the towing vehicle; and a first control unit configured to:

control collecting first vehicle operational data of the first vehicle in the first data recorder; and control collecting second vehicle operational data of the second vehicle in the first data recorder.

9. The system according to claim 8, wherein the first control unit is further configured to:

detect a failure of a second data recorder in the second vehicle;

control collecting second vehicle operational data only upon detecting the failure, wherein the second data recorder, when operating correctly, is configured to collect second vehicle operational data of the second vehicle.

10. The system according to claim 9, wherein the first vehicle comprises a first domain controller and/or the second vehicle comprises a second domain controller, the first and second domain controllers being adapted to provide at least one function independent from collecting vehicle operational data, the first data recorder and/or the first control unit are integrated in the first domain controller;

the second data recorder and/or the second control unit are integrated in the second domain controller.

11. A vehicle combination, comprising:

at least two coupled vehicles; and a system for data recording according to claim 8, wherein the system is implemented in one or both of the at least two coupled vehicles of the vehicle combination.

12. A vehicle combination according to claim 11, further comprising:

a communication interface for exchanging vehicle operational data collected by respective data recorders between both of the two coupled vehicles.

13. A computer product comprising a non-transitory computer-readable storage medium with stored program code which, when extended in one or more processors, carries out the acts of:

collecting, by a first data recorder, first vehicle operational data of a first vehicle that is a towing vehicle in a vehicle combination, where the vehicle combination includes the first vehicle and a second vehicle that is a towed vehicle coupled to the towing vehicle, the first vehicle including the first data recorder and the second vehicle including a second data recorder; and collecting, by the first data recorder, second vehicle operational data of the second vehicle.

* * * * *